Figure 1:
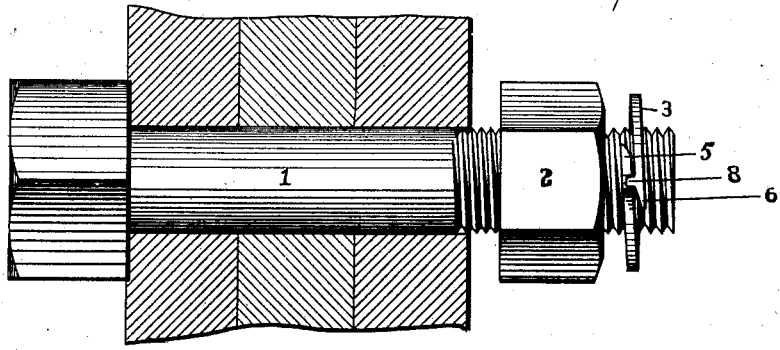

No. 859,785. PATENTED JULY 9, 1907.
A. P. STEEL.
NUT LOCK.
APPLICATION FILED JUNE 21, 1906.

Witnesses
Frank H. Carter.
Joshua S. Webster.

Inventor
Abraham P. Steel.
By Percy S. Webster
Attorney

UNITED STATES PATENT OFFICE.

ABRAHAM P. STEEL, OF STOCKTON, CALIFORNIA, ASSIGNOR OF ONE-HALF TO ERWIN A. DAVISON, OF STOCKTON, CALIFORNIA.

NUT-LOCK.

No. 859,785.   Specification of Letters Patent.   Patented July 9, 1907.

Application filed June 21, 1906. Serial No. 322,745.

*To all whom it may concern:*

Be it known that I, ABRAHAM P. STEEL, a citizen of the United States, and a resident of Stockton, in the county of San Joaquin, State of California, have invented certain new and useful Improvements in Nut-Locks; and I do declare the following to be a full, clear, and exact description of the same, such as will enable others skilled in the art to which it appertains to make and use the same, reference being had to the accompanying drawings, and the characters of reference marked thereon, which form a part of this specification.

My invention relates to improvements in nut-locks, my object being to produce such a lock as may be easily and inexpensively made and one which will fit any sort of nut, and one which will be effectual. This object I accomplish by screwing a washer onto the front of the bolt in the front of the nut said washer being provided with certain spring construction as will appear by a perusal of the following specification and claims.

In the drawings similar characters of reference indicate corresponding parts in all the views.

Figure 2:
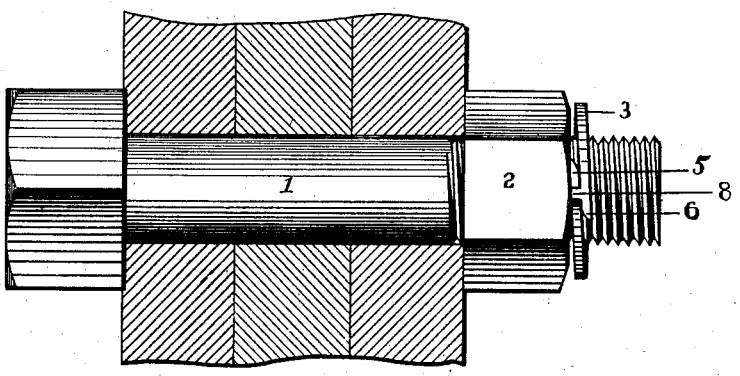
Figure 3:
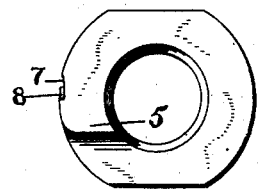

Figure 1 is a view of my device with the parts dissociated. Fig. 2 is a similar view with the nut locked in position. Fig. 3 is a plan view of the improved washer.

1 designates the bolt upon which is mounted the usual nut 2.

The improved device consists of a split washer 3 formed of flat metal of uniform size throughout and internally threaded, the threads corresponding to the threads of the bolts upon which it is to be employed, and with the ends overlapping as at 5, 6, whereby the washer has its greatest thickness at the split, and with the adjacent faces of the overlapping portions reversely inclined, as shown in Fig. 4.

In using the invention the nut is screwed up to the desired point and then the washer 3 is screwed upon the bolt tight against the said nut. The resiliency of the body of the washer causes it to firmly grip the bolt and also causes the tongue 5 to bear against the nut 2, the tension thus serving effectually to prevent the washer and the nut held thereby from retrograde movement upon the bolt. If the nut should happen to move inward the tension of the said spring tongues would hold the washer 3 stationary and when the nut moved outward again it would stop at that point.

On small bolts the washer required might be so small that the two tongues 5 and 6 might spring outward and thus become loosened. To prevent this I have provided a cavity or depression 7 in one of said tongues and a lug 8 on the other tongue adapted to fit into said cavity or depression, thus preventing the two from springing outward.

If desired one of my improved spring washers may be placed at both the front and rear of the nut or two or more may be placed at either the front or rear thereof.

Thus it will be seen that I have provided a means for locking the nut upon the bolt which is very efficient, and may be adapted to any form for nut now in use.

I have entered into a detailed description of the present and preferred form of my invention. Many small details of construction may be modified without departing from the scope thereof, hence I feel myself entitled to all forms of the invention which may fall within the intent of my claims.

Having thus described my invention I claim as new and useful and desire to secure by Letters Patent:

As a new article, a nut lock consisting of a split washer formed of flat sheet metal of the greatest width opposite the split and internally threaded with the ends overlapping flatwise of the washer and the overlapping portions reversely inclined and with a recess in the outer face of one of said overlapping portions and a lug upon the other overlapping portion and adapted to bear in said recesses when the washer is in position upon the bolt.

In testimony whereof I affix my signature in presence of two witnesses.

ABRAHAM P. STEEL.

Witnesses:
PERCY S. WEBSTER,
JOSHUA B. WEBSTER.